(12) United States Patent
Gorecha et al.

(10) Patent No.: US 8,868,667 B2
(45) Date of Patent: Oct. 21, 2014

(54) EMAIL ATTACHMENT HELPER

(75) Inventors: Saurabh Gorecha, Chennai (IN); Arjun Baskaran, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 260 days.

(21) Appl. No.: 13/410,333

(22) Filed: Mar. 2, 2012

(65) Prior Publication Data
US 2013/0232205 A1 Sep. 5, 2013

(51) Int. Cl.
*G06F 15/16* (2006.01)

(52) U.S. Cl.
USPC .......................................... 709/206; 709/204

(58) Field of Classification Search
CPC . H04L 12/581; H04L 12/5855; H04L 12/585; H04L 12/58; H04L 12/5835; G06Q 10/107; G06Q 10/10
USPC .......................................... 709/206, 204, 207
See application file for complete search history.

(56) References Cited

U.S. PATENT DOCUMENTS

| | | | | |
|---|---|---|---|---|
| 6,073,133 A * | 6/2000 | Chrabaszcz | ..................... | 707/10 |
| 6,460,074 B1 * | 10/2002 | Fishkin | ........................ | 709/206 |
| 6,970,908 B1 * | 11/2005 | Larky et al. | .................... | 709/206 |
| 7,016,937 B1 * | 3/2006 | Malik | ........................... | 709/206 |
| 7,574,349 B2 * | 8/2009 | Perronnin | ........................ | 704/9 |
| 8,417,269 B1 * | 4/2013 | Lin | ............................... | 455/466 |
| 2002/0091776 A1 * | 7/2002 | Nolan et al. | .................. | 709/206 |
| 2005/0038863 A1 * | 2/2005 | Onyon et al. | ................. | 709/207 |
| 2007/0100946 A1 * | 5/2007 | Kairis | ........................... | 709/206 |
| 2007/0100947 A1 * | 5/2007 | Chen et al. | .................... | 709/206 |
| 2007/0168666 A1 * | 7/2007 | Craigie | ......................... | 713/176 |
| 2008/0244750 A1 * | 10/2008 | Romero | ......................... | 726/26 |
| 2008/0250112 A1 * | 10/2008 | Chen et al. | .................... | 709/206 |
| 2009/0019119 A1 * | 1/2009 | Scheffler | ....................... | 709/206 |
| 2010/0017404 A1 * | 1/2010 | Banerjee et al. | ................. | 707/6 |
| 2010/0179961 A1 * | 7/2010 | Berry et al. | .................... | 707/769 |
| 2013/0060863 A1 * | 3/2013 | D'Eri et al. | .................. | 709/206 |

* cited by examiner

*Primary Examiner* — Lynn Feild
*Assistant Examiner* — Timothy Sowa

(57) ABSTRACT

A computing device receives instructions, from a user, to send an email message and determines if the email message includes an attachment. When the email message does not include an attachment, the computing device conducts a scan of text of the email message for implications that an attachment should be included. When the email message includes an attachment, the computing device conducts a scan of the email text for implications of a particular type of attachment. The computing device provides, to the user, a notification when there is a positive result from the scan of the email text for implications that an attachment should be included or from the scan of the email text for implications of a particular type of attachment.

20 Claims, 12 Drawing Sheets

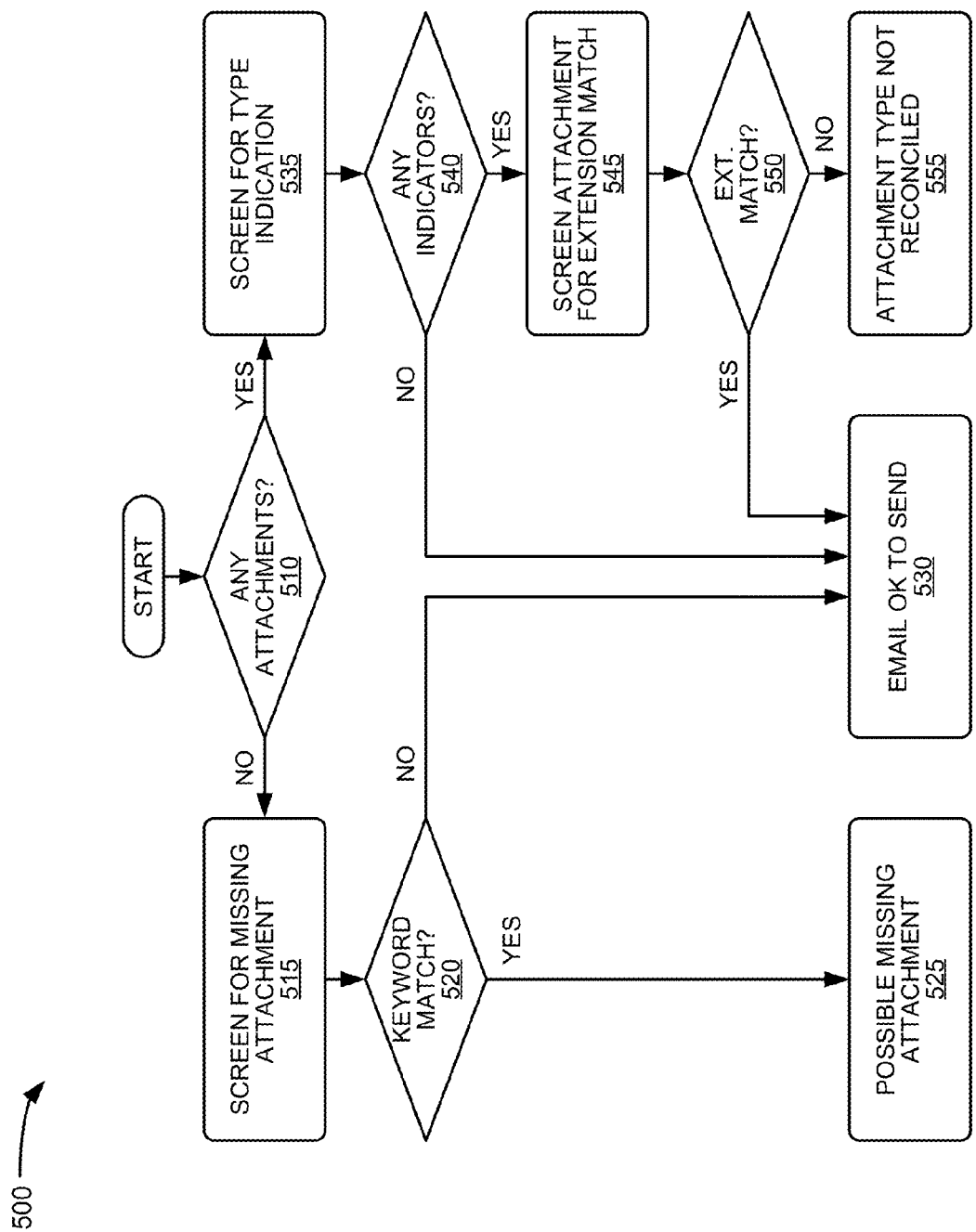

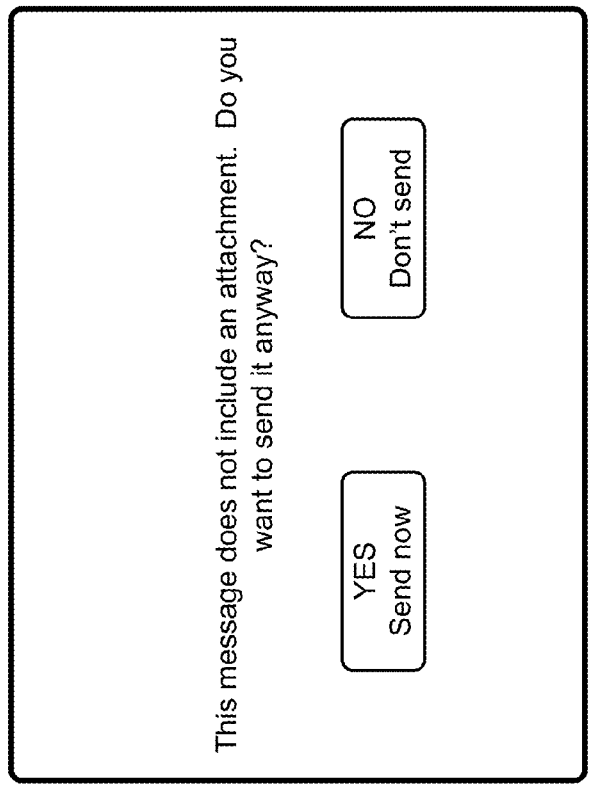
FIG. 6A

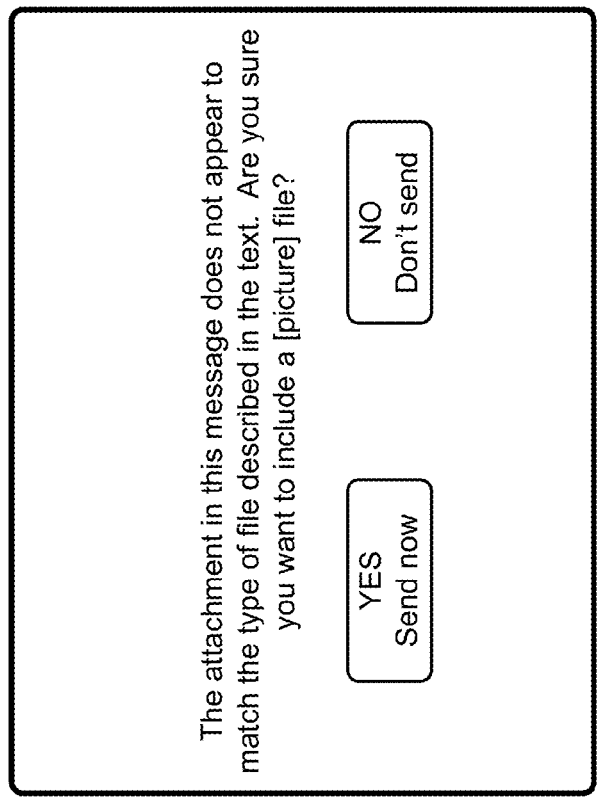
FIG. 6B

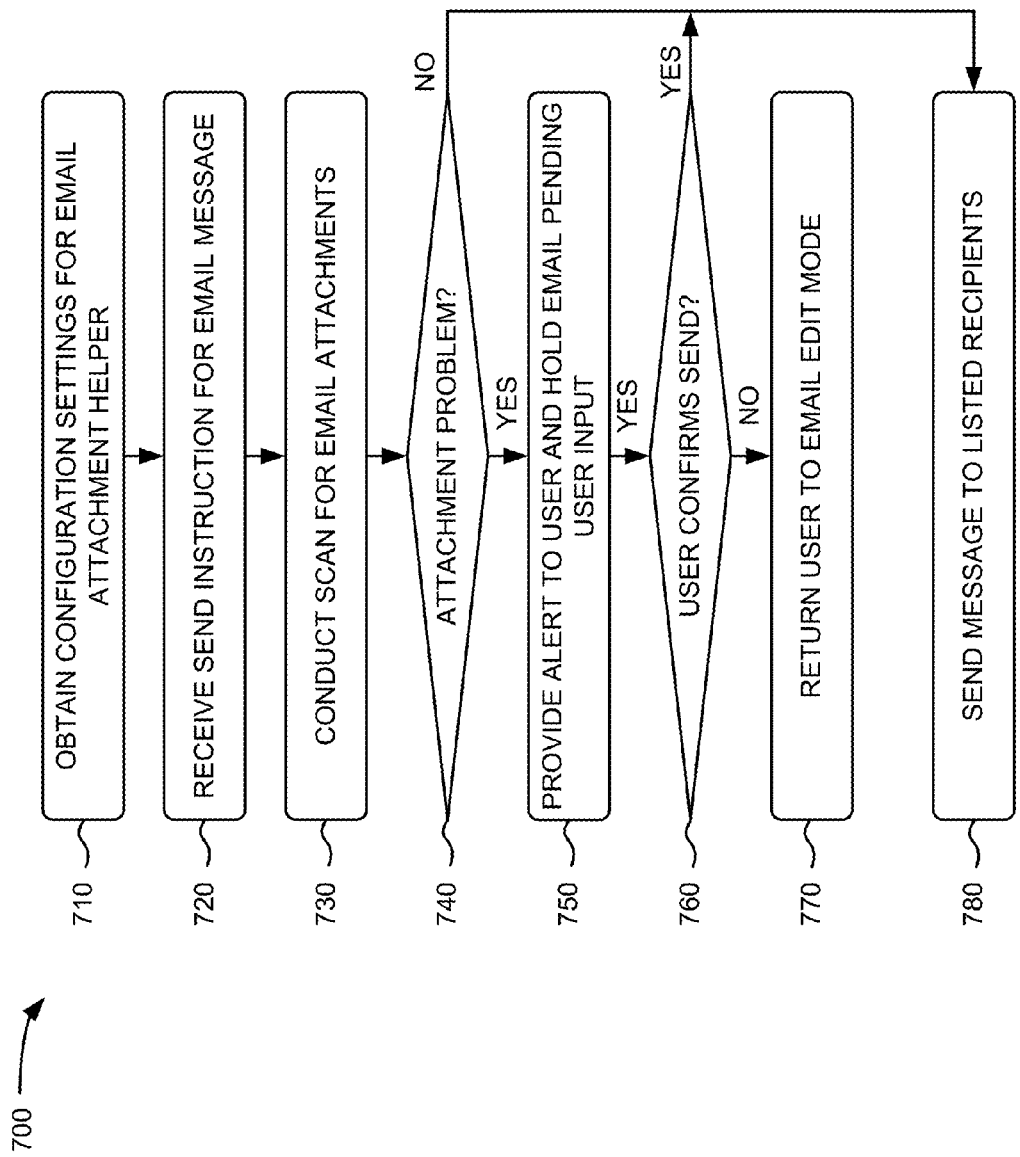

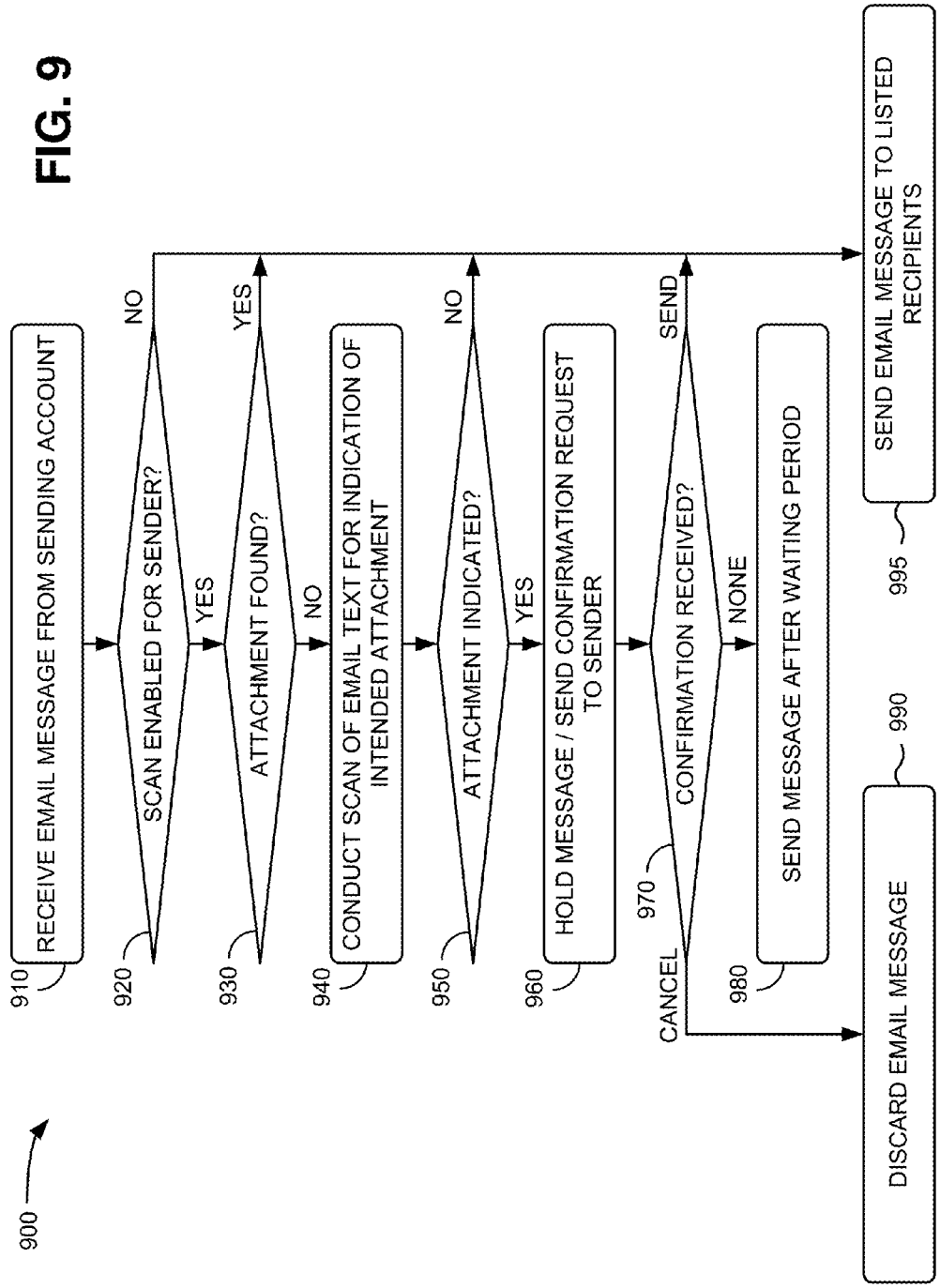

1000

Subject: Request for Delivery Confirmation [005701cceac4$e67e0590$@emailprovider.net]
From: <postmaster@emailprovider.net>
Sent: Wed, February 29, 2012, 1:14PM
To: <sender@emailprovider.net>

1030 — | Send the original message without any attachment? | [SEND] [CANCEL] |

This report relates to a message you sent with the following header fields:

1010 —
Message-id: <005701cceac4$e67e0590$@emailprovider.net>
Date: Mon, 29 Feb 2012 13:13:07 -0500
From: <sender@emailprovider.net>
To: <recipient@emailprovider2.com>
Subject: Pictures from field trip 1020 — Your email message is ON HOLD pending a confirmation from you the sender. The message may be missing an attachment. Simply choose from the options above to confirm sending the message without an attachment or to cancel sending the message. If no response is provided by 1:34 PM, your message will be delivered in its original form.

********* ORIGINAL MESSAGE TEXT *************

1010 —
Date: Mon, 29 Feb 2012 13:13:07 -0500
From: <sender@emailprovider.net>
To: <recipient@emailprovider2.com>
Subject: Pictures from field trip Esther, We had a great time with the kids today. Thanks for letting them come. Here are a few pictures during the trip. Enjoy!

Bertha

FIG. 10

EMAIL ATTACHMENT HELPER

BACKGROUND

A typical email client application (e.g., Google's gmail, Microsoft Outlook, etc.) on a computer or a hand-held device (e.g., a smart phone) allows a user to send email messages with attachments (e.g., one or more files).

BRIEF DESCRIPTION OF THE DRAWINGS

FIG. 5 is an exemplary decision process for an attachment scan, according to an implementation described herein;

FIGS. 6A and 6B are diagrams of exemplary user interfaces for alerting a user of possible attachment problems;

FIG. 7 is a flowchart of an exemplary process for performing an email attachment check, according to an implementation described herein;

FIG. 9 is a flowchart of an exemplary process for performing an email attachment check, according to another implementation described herein; and FIG. 10 is a diagram of an exemplary notification message that may be generated by the mail server of FIG. 1.

DETAILED DESCRIPTION OF PREFERRED EMBODIMENTS

The following detailed description refers to the accompanying drawings. The same reference numbers in different drawings may identify the same or similar elements.

Systems and/or methods described herein may provide an assistant or tool to check for missing attachments in emails and/or to verify a correct type of attachment is included in an email based on the email text. In one implementation, the systems and/or methods may receive instructions, from a user, to send an email message and may determine if the email message includes an attachment. If the email message does not include an attachment, the systems and/or methods may conduct a scan of the email message text for implications that an attachment should be included. If the email message includes an attachment, the systems and/or methods may conduct a scan of the email text for implications of a particular type of attachment. The systems and/or methods may provide, to the user, a notification when there is a positive result from the scan of the email text for implications that an attachment should be included or from the scan of the email text for implications that a different type of attachment should be included.

As used herein, the term "user" is intended to be broadly interpreted to include a user device or a user of a user device.

Figure 1:
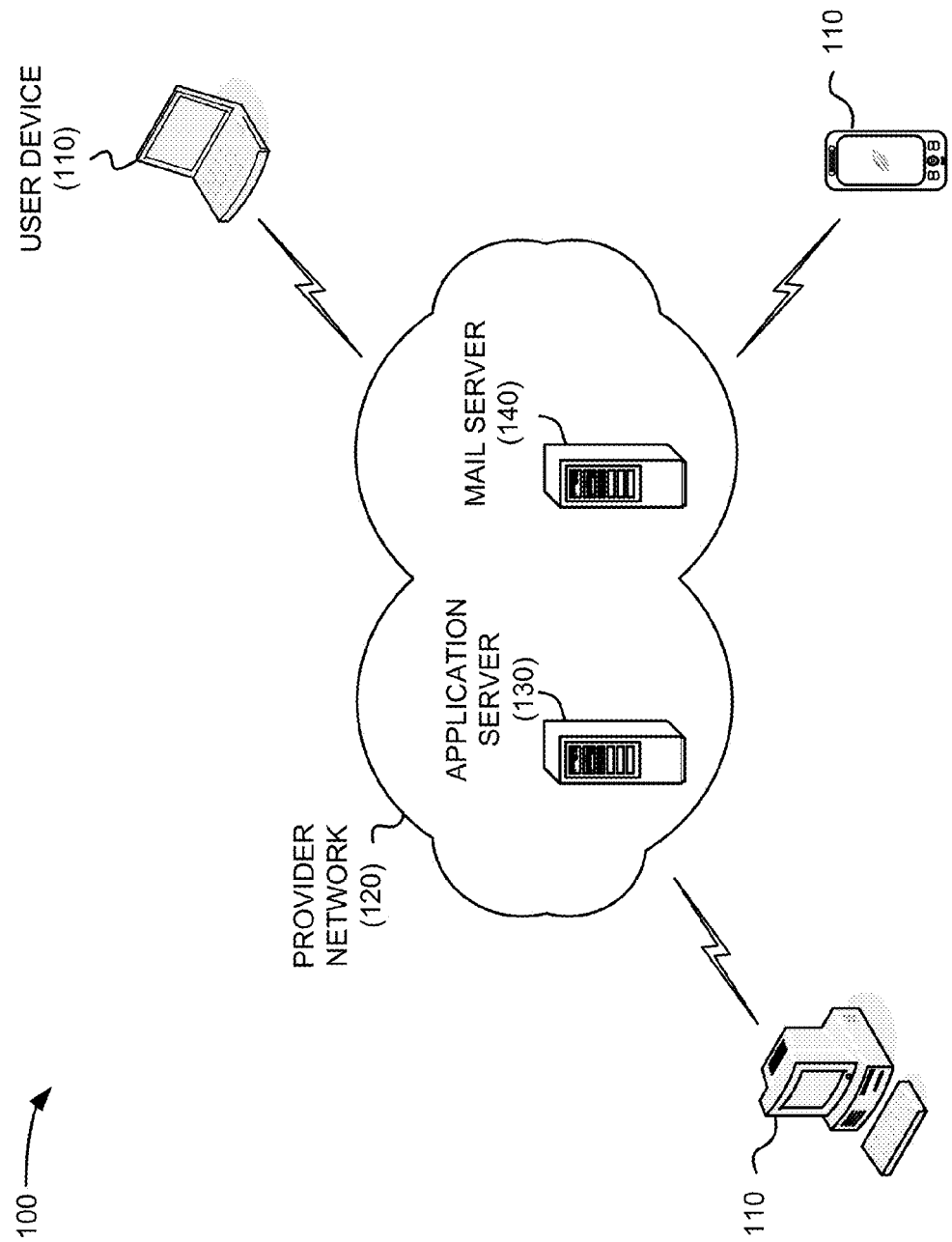
FIG. 1 illustrates a network in which systems and or methods described herein may be implemented.

FIG. 1 is a diagram that illustrates an exemplary network 100 in which systems and/or methods described herein may be implemented. As shown in FIG. 1, network 100 may include user devices 110 and a provider network 120 with an application server 130 and a mail server 140. The devices and/or network of FIG. 1 may be connected via wired and/or wireless connections. The components of FIG. 1 are illustrated for simplicity. In practice, there may be more user devices 110, provider networks 120, application servers 130 and/or mail servers 140. For example, there could be thousands or millions of user devices 110.

User device 110 may include one or more devices capable of storing/executing applications and sending/receiving information (e.g., data, broadband applications, etc.). User device 110 may include, for example, a tablet computer, a smart phone, a personal communications system (PCS) terminal (e.g., that may combine a cellular radiotelephone with data processing and data communications capabilities), a wireless device (e.g., a wireless telephone), a laptop computer, a portable gaming system, a music-playing device, or other types of mobile communication devices. In other implementations, user device 110 may include a fixed computing device, such as a personal computer or a set-top box (STB). User device 110 may include one or more stored applications with various functionalities, such as an email client application and/or a web browser. The email client may be used to retrieve message from a remote storage location (e.g., mail server 140), and draft/send new email messages.

Provider network 120 may include a network that distributes or makes available services, such as, for example, mobile communication services, television services, and/or Internet services. Provider network 120 may generally include a local area network (LAN), a wide area network (WAN), a metropolitan area network (MAN), a wireless network, an optical fiber (or fiber optic)-based network, a cable television network, a satellite television network, or a combination of networks. In some implementations, provider network 120 may be a private network controlled by, for example, a telecommunications company that provides television, telephone, and/or data access to user devices 110. In another implementation, provider network 120 may include a public network, such as the Internet, or a combination of public and private networks. In implementations described herein, provider network 120 may support and/or provide email services for customers of provider network 120. Provider network 120 may include, for example, application servers (e.g., application server 130), mail servers (e.g., mail server 140), data storage and distribution devices, billing devices, and network devices (e.g., routers, switches, firewalls, etc.).

Application server 130 may include one or more network devices, or other types of computation or communication devices (e.g., a server device, an application server device, a Web server device, a database server device, a computer, etc.), to provide email services (e.g., web-based email services) to user devices 110. For example, in one implementation, application server 130 may provide an email client implemented as a web application (e.g., accessed via a web browser from user device 110). In another implementation, application server 130 may provide an email client that may be stored locally on user device 110. As used herein, the term "email client" may refer to a local email application (e.g., stored on user device 110) or web-based email application (e.g., a webmail client provided by application server 130 and accessed via a web browser) to manage a user's email.

Mail server 140 may include one or more network devices, or other types of computation or communication devices (e.g., a server device, an application server device, a Web server device, a database server device, a computer, etc.), to relay e-mails between user devices 110 and/or application server 130. In one implementation, mail server 140 may include a Simple Mail Transfer Protocol (SMTP) server that delivers outgoing messages on behalf of a user (e.g., using a local or web-based email client). In one implementation, mail server 140 may include processing capability to scan text in the message body and/or other fields of an outgoing message received from an email client.

In operation, users may use email clients on user devices 110 and/or application server 130 to send email messages to other users. Emails may be sent with or without attachments. In some instances, users may forget to include an attachment, even though they have made reference to the attachment in the text of the email. In other instances, users may inadvertently attach a different document than intended. Systems and/or methods described herein may screen the text of outgoing emails to identify the possibility of a missing attachment and/or an incorrect type of attachment. In one implementation, the screening may be performed by a local email client (e.g., being executed on user device 110) or a webmail client (e.g., being executed on application server 130). In another implementation, the screening may be performed by mail server 140 to provide a uniform experience across different types of local email client platforms.

Although FIG. 1 shows exemplary devices of network 100, in other implementations, network 100 may include fewer devices, different devices, differently-arranged devices, or additional devices than depicted in FIG. 1. Alternatively, or additionally, one or more devices of network 100 may perform one or more other tasks described as being performed by one or more other devices of network 100.

Figure 2:
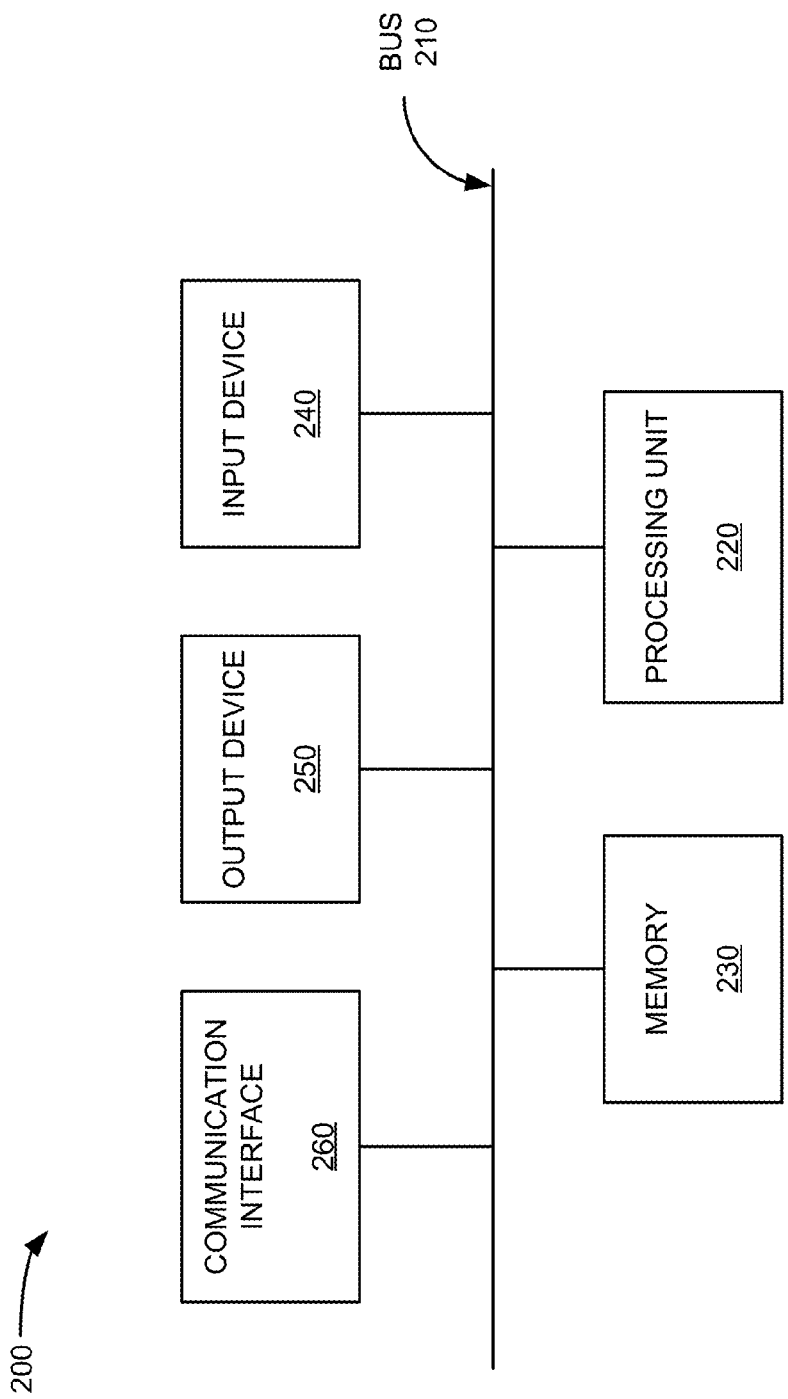
FIG. 2 is a diagram of exemplary components of a device that may be used within the network of FIG. 1.

FIG. 2 is a diagram of exemplary components of a device 200. Device 200 may correspond to user device 110, application server 130, or mail server 140. Each of user device 110, application server 130, or mail server 140 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver (e.g., a transmitter and/or receiver) that enables device 200 to communicate with other devices and/or systems. For example, communication interface 260 may include mechanisms for communicating with other devices, such as other devices of network 100 or another device 200.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
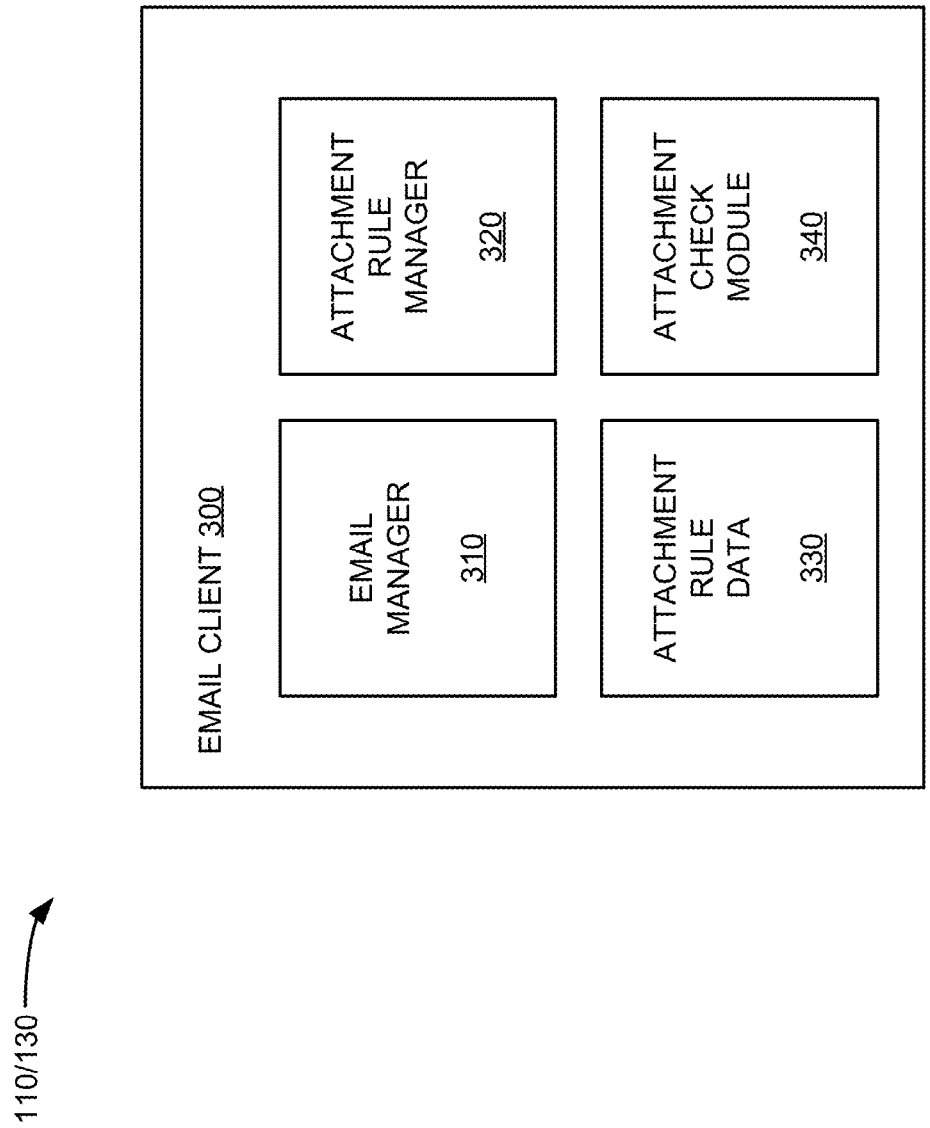
FIG. 3 is a block diagram of exemplary functional components of a user device or web server of FIG. 1.

FIG. 3 is a block diagram of exemplary functional components of user device 110 or application server 130. In one implementation, the functions described in connection with FIG. 3 may be performed by one or more components of device 200 (FIG. 2). As shown in FIG. 3, user device 110 or application server 130 may include an email client application 300 that includes an email manager 310, an attachment rule manager 320, attachment rule data 330, and an attachment check module 340.

Email client 300 may generally provide an application to access a user's email account. For example, email client 300 may receive a user's account credentials (e.g., email address and password) and use this information to retrieve and/or send email messages via mail server 140. When performed by user device 110, functions of email client 300 described in FIG. 3 may be performed by a local email client application 300. When performed by application server 130, functions of email client 300 described in FIG. 3 may be performed by a web-based email client 300 (e.g., webmail) accessed by user device 110 via a web browser.

Email manager 310 may provide an interface for a user to draft, edit, send, and receive email messages. Email manager 310 may receive a message text and a list of intended recipients (e.g., email addresses) that may be input by a user. In one implementation, email manager 310 may provide an interface to include attachments (e.g., document files, image files, video files, etc.) that can be delivered with an email message. As described further herein, email manager 310 may be integrated with an email attachment helper that may screen the text of outgoing emails to identify the possibility of a missing attachment and/or an incorrect type of attachment. The email attachment helper (which may be distributed generally among functional components such as attachment rule manager 320, attachment rule data 330, and attachment check module 340) may initiate a screen of an outgoing email, for example, upon a user providing a send instruction for the email.

Attachment rule manager 320 may include a user interface to present and/or configure rules for performing a check for email attachments prior to sending an email. The user interface may be included as a separate interface or, for example, as part of a larger menu of configurable email preferences. Attachment rule manager 320 may allow a user to selectively enable/disable the email attachment helper. In one implementation, attachment rule manager 320 may provide a default configuration of keywords, phrases, and/or Boolean search terms that may be used (e.g., by attachment check module 340) to identify text in an email message that may be indicative of an attachment. In addition to an email text, attachment rules may also relate to other email fields to identify attachment indications or to overrule other indications. For example, attachment rule manager 320 may include configuration settings that may apply differently to subject lines and email body text. Furthermore, attachment rule manager may include configuration setting to manage responses/replies to original email messages differently than original email messages. In another implementation, attachment rule manager 320 may provide configurable settings in place of or in addition to a default configuration. User interfaces provided by attachment rule manager 320 are described further in connection with FIGS. 4A and 4B.

Still referring to FIG. 3, attachment rule data 330 may store default rules and/or user preferences received from attachment rule manager 320 for the email attachment helper. Attachment rule data 330 may include a separate memory space (e.g., within memory 230) or a shared memory space with other configuration settings for email client 300. In one implementation, attachment rule data 330 may be implemented as a data structure, such as a database, flat files that are organized for storing or looking up information based on one or more keys, a list, a linked list, a hash table, an associative array, trees, and/or another type of data structure that supports lookup/retrieval of information based on one or more keys.

Attachment check module 340 may screen texts of outgoing emails to identify implications of attachments. More particularly, attachment check module 340 may apply rules from attachment rule data 330 to text or other content included in an outgoing email message to identify the possibility of a missing attachment and/or an attachment of an incorrect type. In one implementation, attachment check module 340 may be activated in response to the user providing a send command for a draft email message. An exemplary procedure for applying rules from attachment rule data 330 is described further in connection with FIG. 5. If a scan by attachment check module 340 provides a positive match of a rule, attachment check module 340 may temporarily hold an outgoing message until confirmation is received from a user. In one implementation, attachment check module 340 may provide a prompt screen to a user, prior to releasing an outgoing email message, to confirm an attachment or a particular type of attachment was not intended. User interfaces provided by attachment check module 340 are described further in connection with FIGS. 6A and 6B.

Although FIG. 3 shows exemplary functional components of user device 110/application server 130, in other implementations, user device 110/application server 130 may contain fewer, different, differently-arranged, or additional functional components than depicted in FIG. 3. In still other implementations, a functional component of user device 110/application server 130 may perform one or more tasks described as being performed by another functional component of user device 110/application server 130.

Figure 4A:
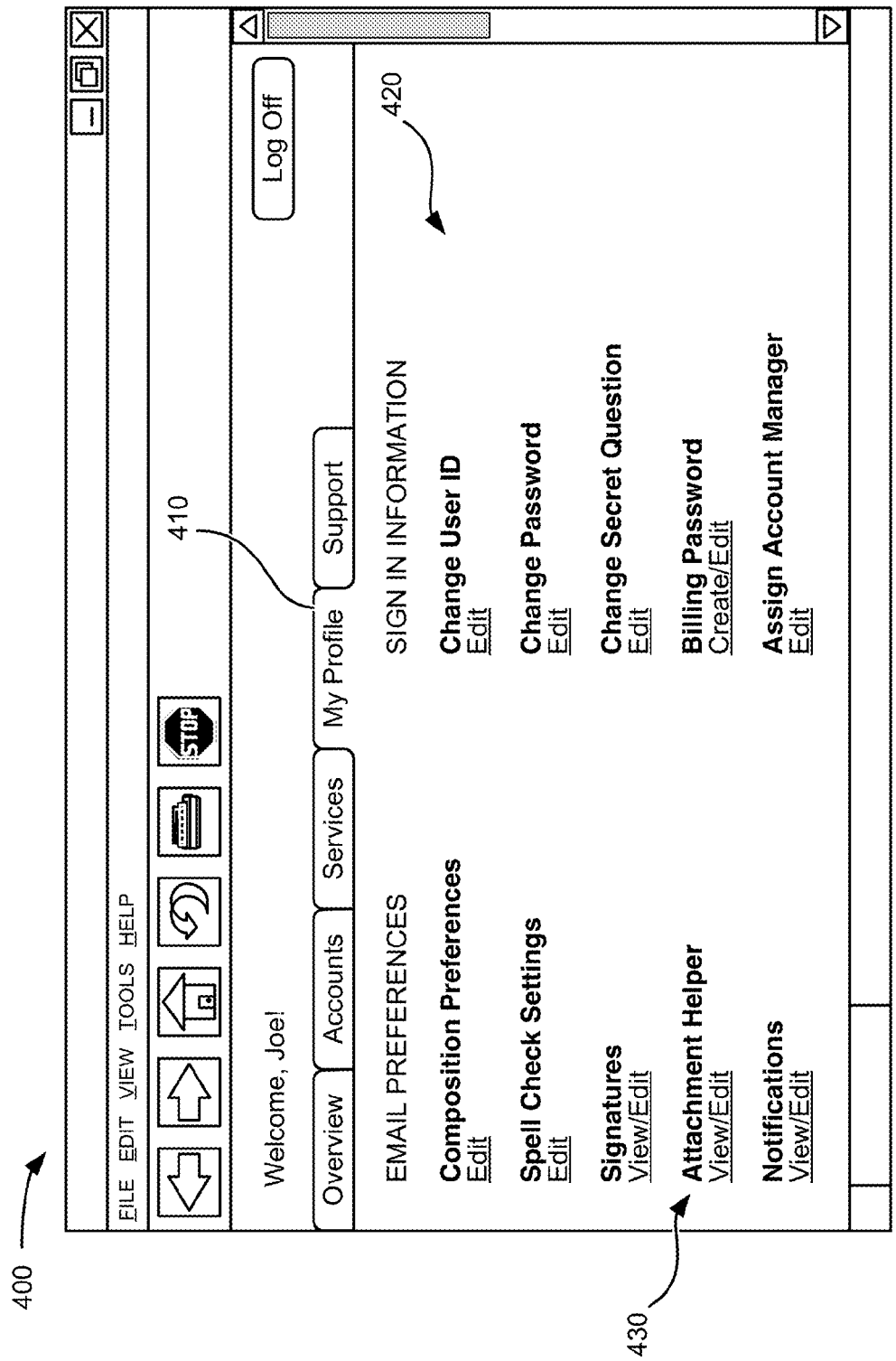
FIGS. 4A and 4B are diagrams of an exemplary user interface for configuring an email attachment helper.
Figure 4B:
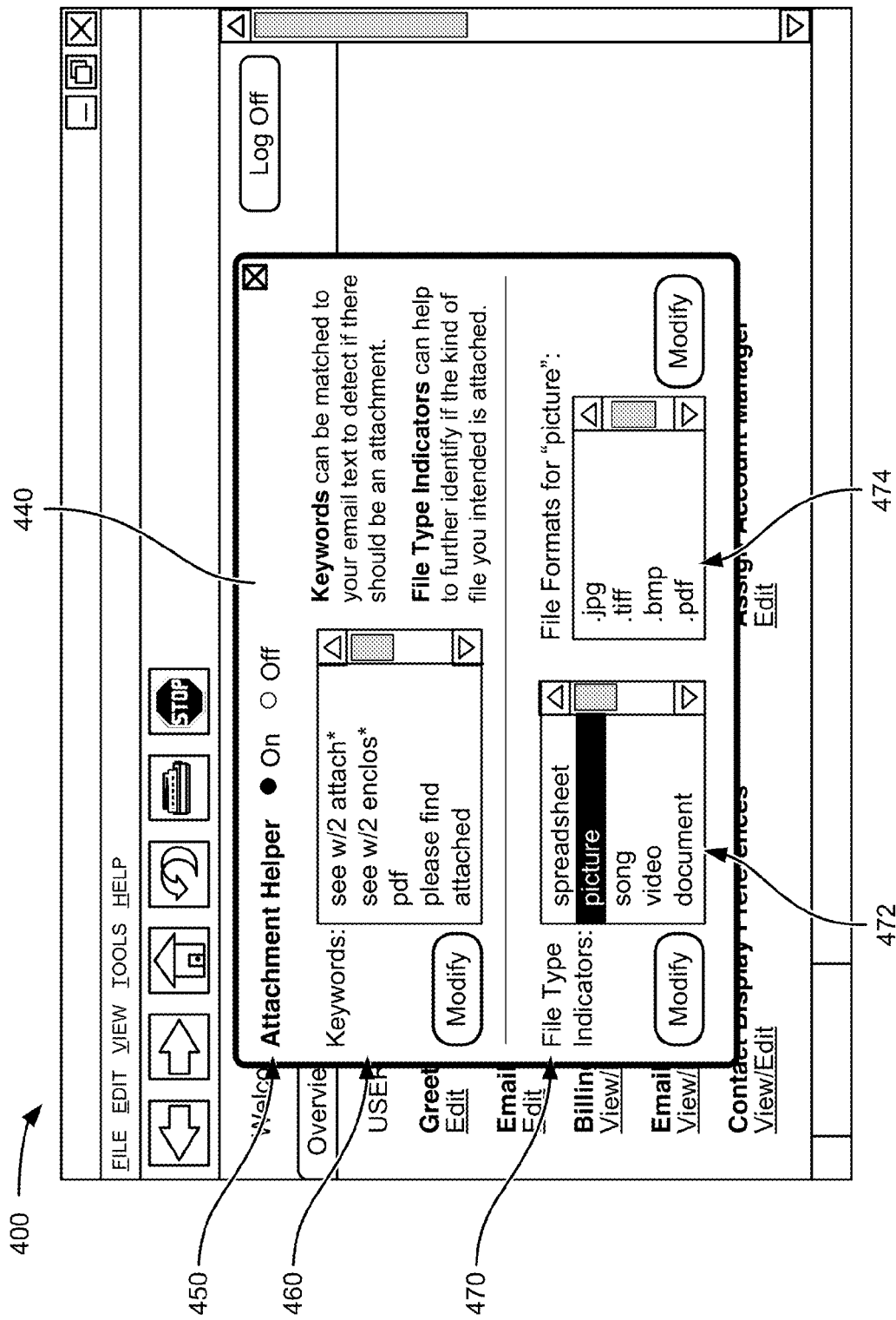

FIGS. 4A and 4B provide an exemplary user interface 400 for configuring an email attachment helper. In one implementation, user interface 400 may be an interface for a local email client running on user device 110. In another implementation, user interface 400 may be an interface for a web-based email client running on application server 130 (e.g., accessible via a browser of user device 110). For example, a user may provide a user name and password that allows the user to access stored information from a server (e.g., application server 130 and/or mail server 140) according to the rights granted to the user account. Using user interface 400, a user may modify user profile settings for an email account, including settings for an email attachment helper.

Referring to FIG. 4A, user interface 400 (e.g., for a user account associated with a user) may be presented on user device 110. User interface 400 may include multiple tabs that present groups of information related to the user's account. A my profile tab 410 may include a profile overview 420 that may allow a user to access a variety of email client preferences and personal information, such as composition preferences (e.g., drafting emails), spell check settings (e.g., dictionary settings, languages, etc.), signatures (e.g., default text appended to an end of an email), notification settings (e.g., alert sounds, pop-ups, etc.), a password associated with the account, and/or a billing information. Profile overview 420 may also include an attachment helper option 430 that may be selected by a user to view and/or change settings for an email attachment helper associated with email client 300. Although FIG. 4A shows exemplary options for profile overview 420, in other implementations, profile overview 420 may contain fewer, different, differently-arranged, or additional sections than depicted in FIG. 4A. Selection of attachment helper option 430 may open a new user interface window 440, shown in FIG. 4B.

Referring to FIG. 4B, user interface window 440 may include an attachment helper interface that includes an activation section 450, a missing attachment configuration section 460, and a wrong attachment configuration section 470.

Activation section 450 may include a selection mechanism, such as a radio button, checkbox, dropdown menu, etc., to allow a user of user interface 400 to select whether to enable the attachment helper feature. For example, selection of the "On" option of activation section 450 (as shown in FIG. 4B) may cause email client 300 (e.g., attachment check module 340) to screen the text of outgoing emails to identify the possibility of a missing attachment and/or an incorrect type of attachment.

Missing attachment configuration section 460 may include a list of search criteria, such as keywords, phrases, search terms, or the like, that may be used to identify a possible indication of an email attachment. The keywords, phrases, search terms, etc. may be populated based on stored information in attachment rule data 330. For example, missing attachment configuration section 460 may include criteria such as a particular word (e.g., "attached," "pdf," etc.) or phrase (e.g., "please find"). Additionally, or alternatively, missing attachment configuration section 460 may include a logical or Boolean combination of conditions or events (e.g., "see w/2 attach*") whose occurrences within an email text may be detected by attachment check module 340.

Search criteria in missing attachment configuration section 460 may include default keywords (e.g., provided as part of a software/plug-in package for email client 300), user-configured terms, or a combination of default keywords and user-configured terms. In one implementation, missing attachment configuration section 460 may include a selection button (e.g., "Modify") that causes user interface 400 to provide another secondary menu to enable a user to add/delete/change search criteria. In another implementation, missing attachment configuration section 460 may include user input fields to add/delete/change search criteria within missing attachment configuration section 460 of user interface window 440. User configuration changes entered via user interface 400 may be stored, for example, in attachment rule data 330 for later use.

Wrong attachment configuration section 470 may include a list of search criteria, such as particular keywords, that may be used to identify a possible indication of a particular type of email attachment. Wrong attachment configuration section 470 may include search terms that may be applicable only if an attachment is already included with an outgoing email. For example, as shown in FIG. 4B, file type indicators 472 may include terms such as "spreadsheet," "picture," "song," "video," "document," etc., that may imply a particular type of attachment. Wrong attachment configuration section 470 may allow types of files 474 (e.g., as indicated by certain file extensions) to be associated with each term in file type indicators 472. For example, as shown in FIG. 4B, the term "picture" in file type indicators 472 may be associated with file extensions ".jpg," ".tiff," ".bmp," and ".pdf." Similarly, other file extensions (or combinations of file extensions) may be associated with different terms from file type indicators 472. For example, the term "documents" may be linked to file extensions such as ".doc," ".docx," ".html," ".pdf," etc.

In another implementation, file type indicators 472 may include a logical or Boolean combination of conditions or events, similar to those described above in connection with missing attachment configuration section 460. For example, wrong attachment configuration section 470 may be configured to associate multiple terms from file type indicators 472 with multiple file extensions in types of files 474. As a simple illustration, terms such as "document," "paper," and "doc" may be linked as a group to a particular list of file extensions, such as ".doc," ".docx," ".html," and ".pdf." Search criteria in wrong attachment configuration section 470 may include default keywords (e.g., provided as part of a software/plug-in package for email client 300), user-configured terms, or a combination of default keywords and user-configured terms. In some implementations, wrong attachment configuration section 470 may include a selection button (e.g., "Modify") that causes user interface 400 to provide one or more secondary menus to enable a user to add/delete/change file type indicators 472 and/or types of files 474.

FIG. 5 provides is an exemplary decision process 500 for an attachment scan that may be performed by attachment check module 340, according to an implementation described herein. Process 500 may be performed, for example, when an outgoing email is detected by email client 300 and an email attachment helper feature is activated. As shown in FIG. 5, it may be determined if the outgoing email includes any attachments (block 510). For example, attachment check module 340 may scan for entries in an attachment field of an outgoing email.

If there are no attachments (block 510—NO), the email may be screened for missing attachments (block 515). For example, attachment check module 340 may apply missing attachment keywords (e.g., from attachment rule data 330/missing attachment configuration section 460) against text of the outgoing email. If there is a keyword match (block 520—YES), a possible missing attachment may be flagged (block 525). For example, attachment check module 340 may identify a keyword, phrase, or logical search condition within the text of the outgoing email to signal the possibility of a missing attachment. If there is not a keyword match (block 520—NO), the outgoing email may be deemed acceptable to send (block 530).

Returning to block 510, if there are attachments (block 510—YES), the outgoing email may be screened for a type of attachment indication (block 535). For example, attachment check module 340 may apply file type indicators (e.g., from attachment rule data 330/file type indicators 472) against text of the outgoing email. If the text of the outgoing mail does not include one of the file type indicators (block 540—NO), the outgoing email may be deemed acceptable to send (block 530).

If the text of the outgoing mail includes one of the file type indicators (block 540—YES), the outgoing email may be screened for a matching extension (block 545). For example, attachment check module 340 may apply file type indicators (e.g., from attachment rule data 330/types of files 474) for the particular file type indicator against the file extension of the attachment(s) in the outgoing email. If the file extension of the attachment(s) in the outgoing email matches one of the types of files (block 550—YES), the outgoing email may be deemed acceptable to send (block 530). If the file extension of the attachment(s) in the outgoing mail does not match one of the types of files (block 550—NO), a possible incorrect attachment may be flagged (block 555).

FIGS. 6A and 6B provide exemplary user interfaces 600/610 for alerting a user of possible attachment problems. In one implementation, user interfaces 600/610 may be part of an interface for a local email client running on user device 110. In another implementation, user interfaces 600/610 may be an interface for a web-based email client running on application server 130 (e.g., accessible via a browser of user device 110). User interfaces 600/610 may be presented, for example, when an email attachment helper detects a potential attachment problem with an outgoing email on email client 300.

Referring to FIG. 6A, user interface 600 may be presented on user device 110 when email client 300 (e.g., attachment check module 340) identifies a keyword, phrase, or logical search condition within the text of the outgoing email that signals the possibility of a missing attachment. User interface 600 may include, for example, a statement to the user indicating a possible need for an attachment (e.g., "This message does not include an attachment. Did you intend to include one?"). User interface 600 may also include selection options to enable the user to release (e.g., "Yes, send now") or prevent sending (e.g., "No, don't send") the email message. If the user selects the release option, user device 110 (e.g., email client 300) may send the email to the intended recipients. If the user selects the prevent sending option, user device 110 (e.g., email client 300) may return to an email editing mode to allow, for example, a user to modify the email attachments.

Referring to FIG. 6B, user interface 610 may be presented on user device 110 when email client 300 (e.g., attachment check module 340) identifies a keyword, phrase, or logical search condition within the file extension of an attachment on the outgoing email that signals the possibility of an incorrect attachment. User interface 610 may include, for example, a statement to the user indicating a possible wrong attachment (e.g., "The attachment in this message does not appear to match the type of file described in the text. Are you sure you want to include a [picture] file?"). User interface 610 may also include selection options to enable the user to release (e.g., "Yes, send now") or prevent sending (e.g., "No, don't send") the email message.

FIG. 7 is a flowchart of an exemplary process 700 for performing an email attachment check, according to an implementation described herein. In one implementation, process 700 may be performed by user device 110. In another implementation, one or more blocks of process 700 may be performed by application server 130. In other implementations, one or more blocks of process 700 may be performed by one or more other devices or a group of devices including or excluding user device 110 and application server 130.

Process 700 may include obtaining configuration settings for an email attachment helper (block 710). For example, user device 110 (e.g., attachment rule manager 320) may include a user interface (e.g., user interface 400) to present and/or configure rules for performing a check for email attachments prior to sending an email. The user interface may allow a user to selectively enable/disable the email attachment helper. Attachment rule manager 320 may provide a default configuration of keywords, phrases, and/or Boolean search terms that may be used (e.g., by attachment check module 340) to identify text in an email message that may be indicative of an attachment. In another implementation, attachment rule manager 320 may provide configurable settings in place of or in addition to the default configuration.

Process 700 may also include receiving a send instruction from an email message (block 720), and conducting a scan for email attachments (block 730). For example, user device 110 (e.g., attachment check module 340) may screen texts of outgoing emails to identify implications of attachments. In one implementation, attachment check module 340 may be activated in response to the user providing a send command for a draft email message. Attachment check module 340 may apply rules from attachment rule data 330 to text of an outgoing email message to identify the possibility of a missing attachment and/or an incorrect type of attachment. In one implementation, attachment check module 340 may apply the screening process described above in connection with FIG. 5. For example, attachment check module 340 may screen for potentially missing attachments and/or the wrong type of attachments.

If the scan does not indicate a potential attachment problem (block 740—NO), the message may be sent to listed recipients (block 780). For example, user device 110 (e.g., attachment check module 340) may permit the email to be sent to the email addresses included in the email message.

If the scan indicates a potential attachment problem (block 740—YES), an alert message may be provided to the user and the email may be held pending user input (block 750). For example, user device 110 (e.g., attachment check module 340) may present one of the user interfaces described in connection with FIGS. 6A and 6B. For example, user interface 600 may be presented on user device 110 when attachment check module 340 identifies a keyword, phrase, or logical search condition within the text of the outgoing email that signals the possibility of a missing attachment. Alternatively, user interface 610 may be presented on user device 110 when attachment check module 340 identifies a keyword, phrase, or logical search condition within the file extension of an attachment on the outgoing email that signals the possibility of an incorrect type of attachment. User interfaces 600/610 may also include selection options to enable the user to release (e.g., "Yes, send now") or prevent sending (e.g., "No, don't send") the email message.

If the user does not confirm sending the email message (block 760—YES), the user may be returned to an email edit mode (block 770). For example, if the user selects the prevent sending option from user interface 600/610, user device 110 (e.g., email client 300) may return to an email editing mode to allow, for example, a user to modify the email attachments.

If the user confirms sending the email message (block 760—YES), the message may be sent to listed recipients (block 780). For example, if the user selects the release option from user interface 600/610, user device 110 (e.g., email client 300) may send the email to the intended recipients.

Figure 8:
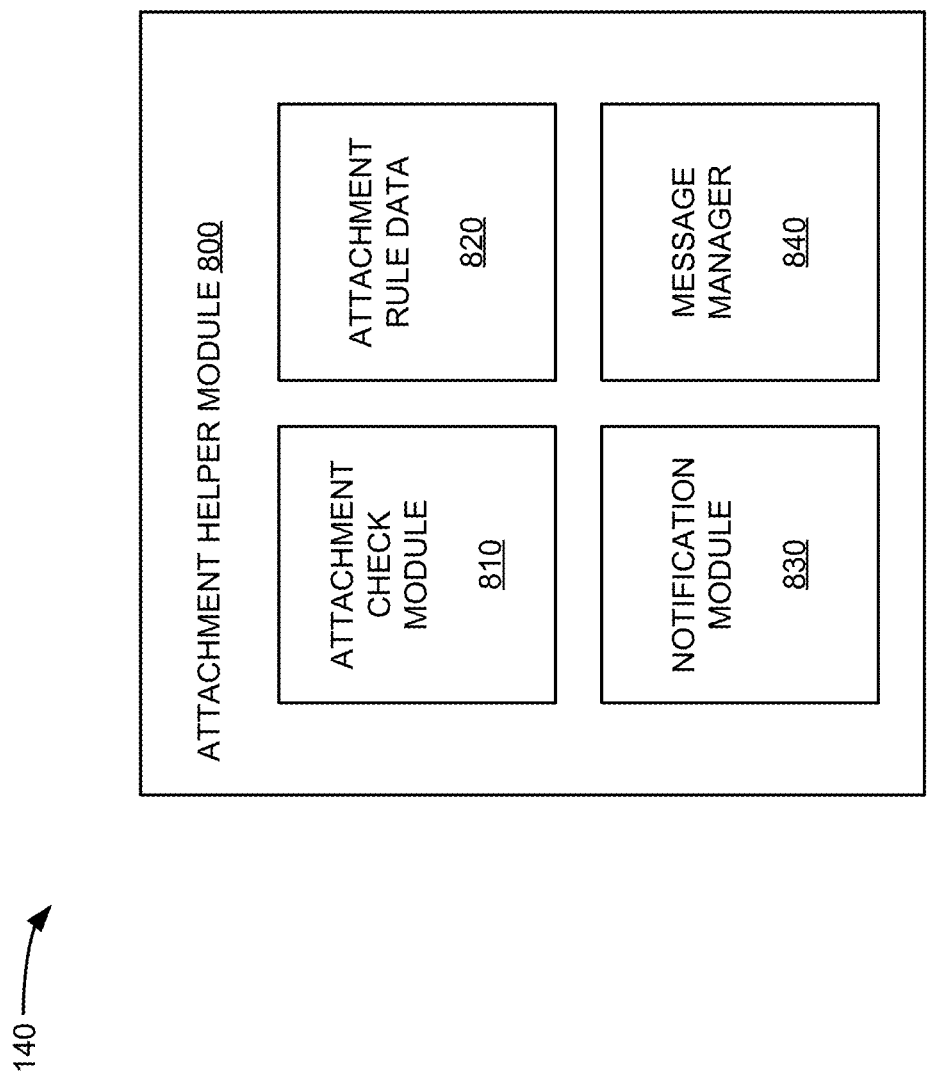
FIG. 8 is a block diagram of exemplary functional components of a mail server of FIG. 1.

FIG. 8 is a block diagram of exemplary functional components of mail server 140. In one implementation, the functions described in connection with FIG. 8 may be performed by one or more components of device 200 (FIG. 2). As shown in FIG. 8, mail server 140 may include an attachment helper module 800 that includes an attachment check module 810, attachment rule data 820, a notification module 830, and a message manager 840.

Attachment helper 800 may generally provide an application to review outgoing email from user's email account for potential attachment problems. Because attachment helper 800 may be implemented at mail server 140, attachment helper 800 may provide consistent email attachment screenings for a user's email account regardless of the particular user interface (e.g., local email client, webmail, mobile interface, etc.) that is used to send outgoing email messages.

Attachment check module 810 may screen text of outgoing emails received from user device 110 or application server 130 to identify potential problems with attachments. More particularly, attachment check module 810 may apply rules from attachment rule data 820 to text of an outgoing email message to identify the possibility of a missing attachment and/or an incorrect type of attachment. In one implementation, attachment check module 810 may use similar procedures for applying rules from attachment rule data 820 as described above in connection with FIG. 5.

Attachment rule data 820 may store rules for attachment check module 810 and/or contact information for notification module 830. Attachment rule data 830 may include a separate memory space (e.g., within memory 230) or a shared memory space with other configuration settings for mail server 140. Rules may include, for example, a default configuration of keywords, phrases, and/or Boolean search terms that may be used (e.g., by attachment check module 810) to identify text in an email message that may be indicative of an attachment or a particular type of attachment. In one implementation, attachment rule data 820 may include a record of registered users (e.g., users who have opted into a service for having text of outgoing emails screen by mail server 140).

Notification module 830 may provide a message to a sender of an outgoing email message if attachment check module 810 detects a possible attachment problem. For example, if a scan by attachment check module 810 provides a positive match of a rule (e.g., a rule from attachment rule data 820), notification module 830 may provide a notification to a sender account (e.g., a "from" account in the email, or another account associated with the sender) to confirm the sender did not intend to include an attachment or a particular type of attachment. The notification may include an email message, a text message, a Short Message Service (SMS) message, an instant message (IM), a mobile IM (MIM), or another type of message. In one implementation, the type of notification provided may be user configurable. For example, a user may elect to receive a notification of a potentially missing attachment via both a return email message and a text message to a phone number associated with the user's account. An exemplary notification message is described further in connection with FIG. 10.

Message manager 840 may receive emails (e.g., outgoing emails from a user account) and identify if the email is associated with a user who has registered for an attachment help service. Message manager 840 may also determine if an attachment is present in the email. In one implementation, message manager 840 may trigger attachment check module 810 to perform a scan in response to receiving an outgoing message, without an attachment, from a registered user (e.g., a from a user account registered to receive an email attachment helper service). Message manager 840 may temporarily hold an outgoing email message while attachment check module 810 performs the scan, and may continue to hold the email message if a potential attachment problem is detected. In one implementation, message manager 840 may hold an outgoing message until a confirmation is received from a user. If no confirmation is received, message manager 840 may hold an outgoing email message for a particular time interval (e.g., 20 minutes) before releasing the email message to the intended recipients. In another implementation, if no response is received, message manager 840 may delete the message after a particular interval (e.g., 3 days).

Although FIG. 8 shows exemplary functional components of mail server 140, in other implementations, mail server 140 may contain fewer, different, differently-arranged, or additional functional components than depicted in FIG. 8. In still other implementations, a functional component of mail server 140 may perform one or more tasks described as being performed by another functional component of mail server 140.

FIG. 9 is a flowchart of an exemplary process 900 for performing an email attachment check, according to an implementation described herein. In one implementation, process 900 may be performed by mail server 140. In another implementation, one or more blocks of process 900 may be performed by one or more other devices or a group of devices including or excluding mail server 140.

Process 900 may include receiving an email message from a sending account (block 910) and determining if an email attachment helper is enabled for the sending account (block 920). For example, mail server 140 (e.g., message manager 840) may receive emails (e.g., outgoing emails from a user account) and identify if the email is associated with a user who has registered for an attachment help service.

If an email attachment helper is not enabled for the sending account (block 920—NO), process 900 may include sending the email message to the listed recipients (block 995). For example, mail server 140 (e.g., message manager 840) may simply forward the email message in accordance with normal procedures.

If an email attachment helper is enabled for the sending account (block 920—YES), process 900 may include determining if the email includes an attachment (block 930). For example, mail server 140 (e.g., attachment check module 810) may determine if an attachment is present in the email. If an email attachment is found (block 930—YES), the email message may be sent to the listed recipients (block 995). If an email attachment is not found (block 930—NO), process 900 may include conducting a scan of the email text for an indication of an intended attachment (block 940). For example, message manager 840 may trigger attachment check module 810 to perform a scan in response to receiving an outgoing message, without an attachment, from a registered user. Attachment check module 810 may apply rules from attachment rule data 820 to text of an outgoing email message to identify the possibility of a missing attachment.

If the email text does not indicate an intended attachment (block 950—YES), process 900 may include sending the email message to the listed recipients (block 995). If the email text indicates an intended attachment (block 950—YES), process 900 may include holding the outgoing email message and sending a confirmation request to the sender (block 960). For example, mail server 140 (e.g., notification module 830) may temporarily hold an outgoing email message while attachment check module 810 performs the scan, and may continue to hold the email message if a potential attachment problem is detected. Notification module 830 may provide a notification to a sender account (e.g., a "from" account in the email, or another account associated with the sender) to confirm that the sender did not intend to include an attachment.

If a positive response is received from the sender (block 970—SEND), the email message may be sent to the listed recipients (block 995). If a confirmation is not received from the sender (block 970—NONE), the email message may be sent after a waiting period (block 980). For example, mail server 140 (e.g., message manager 840) may hold an outgoing message until a confirmation is received from a user. If no confirmation is received, message manager 840 may hold an outgoing email message for a particular time interval (e.g., 20 minutes) before releasing the email message to the intended recipients.

If a negative response is received from the sender (block 970—CANCEL), the email message may be discarded (block 990). For example, email server 140 (e.g., message manager 840) may not send the original outgoing email and may drop the email delivery.

FIG. 10 provides an exemplary notification message 1000 that may be generated by mail server 140 (e.g., notification module 830). Notification message 1000 may be sent from mail server 140 to user device 100 (e.g., associated with a particular sender's email account) in response to mail server 140 (e.g., attachment check module 810) detecting the possibility of a missing attachment in an outgoing email from the sender.

Notification message 1000 may include one or more message identification sections 1010, an instruction section 1020, and a user input section 1030. Message identification sections 1010 may include information to indicate the particular outgoing email message that was placed on hold by mail server 140. Instruction section 1020 may include an explanation that for the email and instructions for how the sender can reply.

User input section 1030 may include a response mechanism to enable a user (e.g., the recipient of notification message 1000) to provide instructions to mail server 140. For example, user input section 1030 may include links, integrated attachments, scripts, etc. that may permit a user to conveniently respond to instruction section 1020. For example, selecting "Send" in input section 1030 may cause user device 110 to automatically generate an email from the user account to mail server 140 that indicates the particular outgoing email (e.g., using the unique message ID) and instructions to send the outgoing email. Additionally, or alternatively, input section 1030 may include instructions for manually responding to notification message 1000 (e.g., in the event user device 110 does not support formats to automatically generate an email).

Although FIG. 10 shows exemplary information that may be included in notification message 1000, in other implementations, mail server 140 (e.g., notification module 830) provide different or additional information in notification message 1000. For example, in other implementations, email message 1000 may include an explanation of the attachment helper service that caused the outgoing email to be place on hold and/or a link to allow a user to modify a setting or opt out of the attachment helper service.

Systems and/or methods described herein may store configuration settings for an email attachment helper application and receive, from a user, instructions to send an email message. The systems and/or methods may determine if the email message includes an attachment. If the email message does not include an attachment, the systems and/or methods may conduct, based on the configuration settings, a scan of the email message text for an implication that an attachment should be included. If the email message includes an attachment, the systems and/or methods may conduct, based on the configuration settings, a scan of the email text for an implication of a particular type of attachment. The systems and/or methods may hold the email message when there is a positive result from the scan of the email text for implications that an attachment should be included or for implications that a particular type of attachment should be included, and may present a notification to the user.

The foregoing description provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 5, 7 and 9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by one or more computing devices, instructions, from a user, to send an email message;
   determining, by the one or more computing devices, if the email message includes an attachment;
   conducting, by the one or more computing devices, a scan of text of the email message for implications that an attachment should be included when the email message does not include an attachment;
   conducting, by the one or more computing devices, a scan of the email text for indicators of a particular file type of attachment intended by the user when the email message includes an attachment; and
   providing, by the one or more computing devices and to the user, a notification when there is a positive result from the scan of the email text for implications that an attachment should be included or from the scan of the email text for indicators of a particular file type of attachment intended by the user.

2. The method of claim 1, further comprising:
   holding the email message when there is a positive result from the scan of the email text for implications that an attachment should be included or from the scan of the email text for indicators of a particular file type of attachment intended by the user.

3. The method of claim 1, wherein the notification includes an option for user input to release the email message or cancel sending the email message, and wherein the method further comprises:
   sending the email message when the user provides input to release the email message; and
   return to an email editing screen when the user provides input to cancel sending the email message.

4. The method of claim 1, wherein the method is performed by an email client application residing on a user device.

5. The method of claim 1, wherein the method is performed by a webmail client residing on a network device.

6. The method of claim 1,
   wherein conducting a scan of the email text for indicators of a particular file type of attachment intended by the user includes comparing keywords in the email text to a file extension for the attachment.

7. The method of claim 6, further comprising:
   obtaining configuration settings for an email attachment helper application.

8. The method of claim 7, wherein the configuration settings include user configurable keywords.

9. A device, comprising:
   one or more memories to store a plurality of instructions; and
   one or more processors configured to execute instructions in the one or more memories to:
   store, in the memory, configuration settings for an email attachment helper application,
   receive, from a user, instructions to send an email message,
   determine if the email message includes an attachment,
   conduct, based on the configuration settings, a scan of text of the email message for an implication that an attachment should be included when the email message does not include an attachment,
   conduct, based on the configuration settings, a scan of the email text for indicators of a particular file type of attachment intended by the user when the email message includes an attachment,
   holding the email message when there is a positive result from the scan of the email text for implications that an attachment should be included or for indicators that a particular file type of attachment intended by the user should be included, and
   present, to the user, a notification when there is a positive result from the scan of the email text for implications that an attachment should be included or for indicators that a particular file type of attachment intended by the user should be included.

10. The device of claim 9, wherein the processor is further configured to provide a user interface to solicit configuration settings for the email attachment helper application.

11. The device of claim 9, wherein the notification includes an option for user input to release the email message or cancel sending the email message.

12. The device of claim 9, wherein the device includes one of:
   a tablet computer,
   a smart phone,
   a personal communications system (PCS) terminal,
   a wireless device,
   a laptop computer,
   a portable gaming system,
   a music-playing device,
   a personal computer, or
   a set-top box.

13. The device of claim 9, wherein the device includes an application server including a webmail interface.

14. The device of claim 9, wherein the processor is further configured to:
- detect the file type of attachment when the email message includes an attachment, wherein conducting a scan of the email text for the indicator of a particular file type of attachment intended by the user includes comparing keywords in the email text to a file extension for the attachment.

15. A method, comprising:
- receiving, by one or more network devices, an outgoing email message from a sender email account;
- determining, by one of the network devices, if an attachment scanning feature is active for the sender email account;
- determining, by one of the network devices, that the outgoing email message includes an attachment;
- conducting, by one of the network devices, a scan of the text of the outgoing email message for indicators of a particular file type of attachment intended by a sender;
- holding, by one of the network devices, the outgoing email message when the scan of the text indicates the attachment is not of the particular file type of attachment intended by the sender; and
- sending, by one of the network devices and to the sender, a confirmation request when the scan of the text indicates the attachment is not of the particular file type of attachment intended by the sender.

16. The method of claim 15, further comprising:
- receiving, from the sender and in response to the confirmation request, a confirmation message to release the email message; and
- sending the email message in response to the confirmation message.

17. The method of claim 15, further comprising:
- receiving, from the sender and in response to the confirmation request, a cancel message to stop sending the email message; and
- not sending the email message in response to the cancel message.

18. The method of claim 15, wherein the confirmation request includes one or more of:
- a Short Message Service (SMS) message,
- an instant message (IM),
- a mobile IM (MIM), or
- an email message.

19. The method of claim 15, further comprising:
- generating the confirmation request that includes identification of the outgoing email message, instructions for responding to the confirmation request, and a user input section to automatically generate a response to the confirmation request based on a sender selection.

20. The method of claim 15, wherein the one or more network devices include a Simple Mail Transfer Protocol (SMTP) mail server.

* * * * *